United States Patent [19]

Keziah, Jr.

[11] Patent Number: 5,479,344

[45] Date of Patent: Dec. 26, 1995

[54] INSURANCE COMPUTATION DISPLAY

[75] Inventor: Howard L. Keziah, Jr., Charlotte, N.C.

[73] Assignee: Impact Technologies Group, Inc., Charlotte, N.C.

[21] Appl. No.: 249,396

[22] Filed: May 26, 1994

[51] Int. Cl.$^6$ .............................................. G06F 157/00
[52] U.S. Cl. .................. 364/40 B; 364/406; 364/710.04; 395/161; 395/164
[58] Field of Search ....................................... 364/400, 401, 364/407, 408, 705.06, 710.04, 709.04; 395/155, 161, 164, 600

[56] References Cited

U.S. PATENT DOCUMENTS

| | | | |
|---|---|---|---|
| 4,648,037 | 4/1987 | Valentino | 364/408 |
| 4,831,526 | 5/1989 | Luchs et al. | 364/401 |
| 4,837,693 | 6/1989 | Schotz | 364/408 |
| 4,852,057 | 7/1989 | Patton | 364/709.06 |
| 4,899,292 | 2/1990 | Montagna et al. | 395/147 |
| 5,179,698 | 1/1993 | Bachman et al. | 395/600 |
| 5,220,500 | 6/1993 | Baird et al. | 364/408 |
| 5,231,571 | 7/1993 | D'Agostino | 364/408 |
| 5,233,513 | 8/1993 | Doyle | 364/401 |
| 5,245,535 | 9/1993 | Weiss et al. | 364/407 |
| 5,339,392 | 8/1994 | Risberg et al. | 395/161 |

*Primary Examiner*—Gail O. Hayes
*Assistant Examiner*—Joseph Thomas
*Attorney, Agent, or Firm*—Rhodes, Coats & Bennett

[57] ABSTRACT

An apparatus for illustrating a life insurance needs computational presentation includes a computer including a memory and a processor, a video-style screen operatively connected to the computer for displaying data in numbers quantifying estate tax obligations of a proposed insured's estate to a viewer and obtaining the data to be displayed from the computer, a data input device operatively connected to the computer for inputting data concerning the proposed insured's estate to the computer, the computer memory including a first routine operable by the processor to receive estate data from the data input device and to act on the data in a computational fashion and to show the result of the computation including estate tax numbers on the video-style screen and a second routine operable by the processor to respond to an input from the data input device to display on the screen a derivation of an estate tax computation shown on the screen.

23 Claims, 9 Drawing Sheets

Corresponding Confidence Tape for "NetTax", 1 Level:

| Gross Estate Tax | | 2,483,500.00 |
|---|---|---|
| Unified Credit | − | 192,800.00 |
| Federal Estate Taxes Due | = | 2,290,700.00 |

Fig. 3

Corresponding Confidence Tape for "NetTax", 2 Levels:

| Taxable Estate | | $5,170,000.00 |
|---|---|---|
| Tax Table Maximum | − | $3,000,000.00 |
|  | = | $2,170,000.00 |
| Marginal Tax Rate | x | 55% |
|  | = | 1,193,500.00 |
| Tax on First $3,000,000 | + | 1,290,800.00 |
| Gross Estate Tax | = | 2,483,500.00 |
| Unified Credit | − | 192,800.00 |
| Federal Estate Taxes Due | = | 2,290,700.00 |

Fig. 4

Corresponding Confidence Tape for "NetTax", 3 Levels:

| Tax Table Maximum | | $3,000,000.00 | |
|---|---|---|---|
| Tax Table Rate | x | 43% | |
| Tax on First $3,000,000 | = | 1,290,800.00 | ⇒ M1 |
| Taxable Estate | | $5,170,000.00 | |
| Tax Table Maximum | − | $3,000,000.00 | |
|  | = | $2,170,000.00 | |
| Marginal Tax Rate | x | 55% | |
|  | = | 1,193,500.00 | |
| Tax on First $3,000,000 | + | 1,290,800.00 | ⇐ M1 |
| Gross Estate Tax | = | 2,483,500.00 | |
| Unified Credit | − | 192,800.00 | |
| Federal Estate Taxes Due | = | 2,290,700.00 | |

Fig. 5

INSURANCE COMPUTATION DISPLAY

BACKGROUND OF THE INVENTION

The present invention relates to an improved method and apparatus for making presentations during which it may be desirable to "backtrack" and confirm the correctness of data and conclusions obtained in the presentation. In a particular embodiment, the invention is useful in preparing and presenting calculations of life insurance needs to meet estate tax and other needs.

The sale of life insurance to pay final expenses including burial, probate expenses, attorney fees, state death taxes and federal estate taxes is well known. The need for such insurance in many cases is well documented. What is often difficult for both potential insurance customers and insurance salespeople is to determine the amount of insurance that is likely to be needed for that particular customer. While the insurance sales professional can determine such amount using certain assumptions and customer-provided information, the customer can easily become confused about how the salesman has come up with a particular proposed insurance amount. Even when the salesman carefully discusses the situation with the prospect, the complexity of the calculations and the prospect's unfamiliarity with many of the concepts quickly leads to a lack of understanding of the rationale for a given insurance proposal. Too often, this leads to a lost sale or, at the least, the need for the salesperson to repeatedly go over the computations with the prospect to show the insurance need. This leads to a loss of efficiency, at the least.

Accordingly there is a need in the art for a tool to assist the sales professional in calculating the insurance need and in demonstrating the correctness of that calculation to the prospect.

SUMMARY OF THE INVENTION

The present invention fulfills this need in the art by providing an apparatus for illustrating a life insurance needs computational presentation including a computer including a memory and a processor, a video-style screen operatively connected to the computer for displaying data in numbers quantifying estate tax obligations of a proposed insured's estate to a viewer and obtaining the data to be displayed from the computer. A data input device is operatively connected to the computer for inputting data concerning the proposed insured's estate to the computer. The computer memory includes a first routine operable by the processor to receive estate data from the data input device and to act on the data in a computational fashion and to show the result of the computation including estate tax numbers on the video-style screen. A second routine operable by the processor responds to an input from the data input device to display on the screen a derivation of an estate tax computation shown on the screen.

In one embodiment the data input device includes a mouse-controlled pointer for the screen, the mouse being operable to identify items appearing on the screen and the second routine is triggered for a number on the screen by actuation of the mouse when the pointer identifies a number, the derivation of which is to be displayed on the screen. Typically, the data input device also includes a keyboard having alpha-numeric keys.

In a preferred embodiment as a user inputs estate data into the apparatus through the data input device, steps of the computation proceed and the first routine stores data in the memory useful in the second routine's derivation display. Preferably, the first routine stores data for at least one step of a computation that includes a computational step number, a value, a description or description index, and operator, a first operand and a second operand. Desirably, the data stored for an operand is a computational step number of another step. The second routine generates its derivational display by using the stored data, and links the steps of the displayed derivation by using computational step numbers stored as operands as pointers to include displays of other steps in a derivation. Preferably, the second routine continues recursively to accumulate derivation steps for display until the operands are not derived.

In a preferred embodiment, the apparatus is used to illustrate a life insurance needs computational presentation. The video-style screen displays data in numbers quantifying estate tax obligations of a proposed insured's estate to a viewer. The data input device receives data concerning the proposed insured's estate. The first routine acts on the input estate data in a computational fashion to determine estate tax obligations and to illustrate how life insurance can be used to meet such obligations. The appartus preferablly includes a printer to print data and computation results.

The invention also provides a method of illustrating a life insurance needs computational presentation including providing a computer including a memory and a processor, a video-style screen operatively connected to the computer and a data input device operatively connected to the computer. The method proceeds by inputting data concerning a proposed insured's estate to the computer, acting on the estate data in a computational fashion, and storing data in the memory that includes a computational step number, a value, a description or description index, an operator, a first operand and a second operand and in which the data stored for an operand is a computational step number of another step. Further steps include displaying data in numbers quantifying estate tax obligations of the proposed insured's estate to a viewer on the video-style screen and making an input to the computer indicating a command to show a computational derivation of a number displayed on the video-style screen. The method continues by responding to the command by using the stored data from which the displayed number is directly calculated as a starting point, linking the steps of the derivation of the computational result by using computational step numbers stored as operands to point to other steps in a derivation to be displayed, continuing recursively to discern derivation steps for display until the operands are not derived, and displaying the steps of the derivation in order by displaying data stored about steps leading to the displayed number.

The method may also include the step of preparing a copy of the data and program commands on a portable, machine-readable medium for the proposed insured. This permits the proposed insured to take the copy and consult other advisers concerning the insurance salesperson's proposal.

The invention is, of course, not limited to estate tax funding computatations, but can be used for other insurance needs and financial planning, as well as non-insurance and non-finance uses. Within the insurance field it is useful for split dollar insurance presentations and the like. The presentation techniques provided by the invention are applicable to any presentation in which data is acted upon to lead to conclusions.

More broadly, the invention provides an apparatus for illustrating a computational presentation including a computer including a memory and a processor, a video-style screen operatively connected to the computer for displaying data in numbers to a viewer and obtaining data to be displayed from the computer, and a data input device operatively connected to the computer for inputting data to the computer. The computer memory includes a first routine operable by the processor to operate the computer to receive data from the data input device and to act on the data in a computational fashion and to show the result of the computation on the video-style screen and a second routine operable by the processor to respond to an input from the data input device to display on the screen a derivation of a computational result shown on the screen together with the computational result.

BRIEF DESCRIPTION OF THE DRAWINGS

The invention will be better understood after a review of the Detailed Description of a Preferred Embodiment along with a review of the drawings in which:

FIG. 3 is a view of a sample confidence tape capable of being displayed in the preferred embodiment of the invention;

FIG. 4 is a view of a second sample confidence tape capable of being displayed in the preferred embodiment of the invention;

FIG. 5 is a view of a third sample confidence tape capable of being displayed in the preferred embodiment of the invention;

DETAILED DESCRIPTION OF A PREFERRED EMBODIMENT

Figure 1:
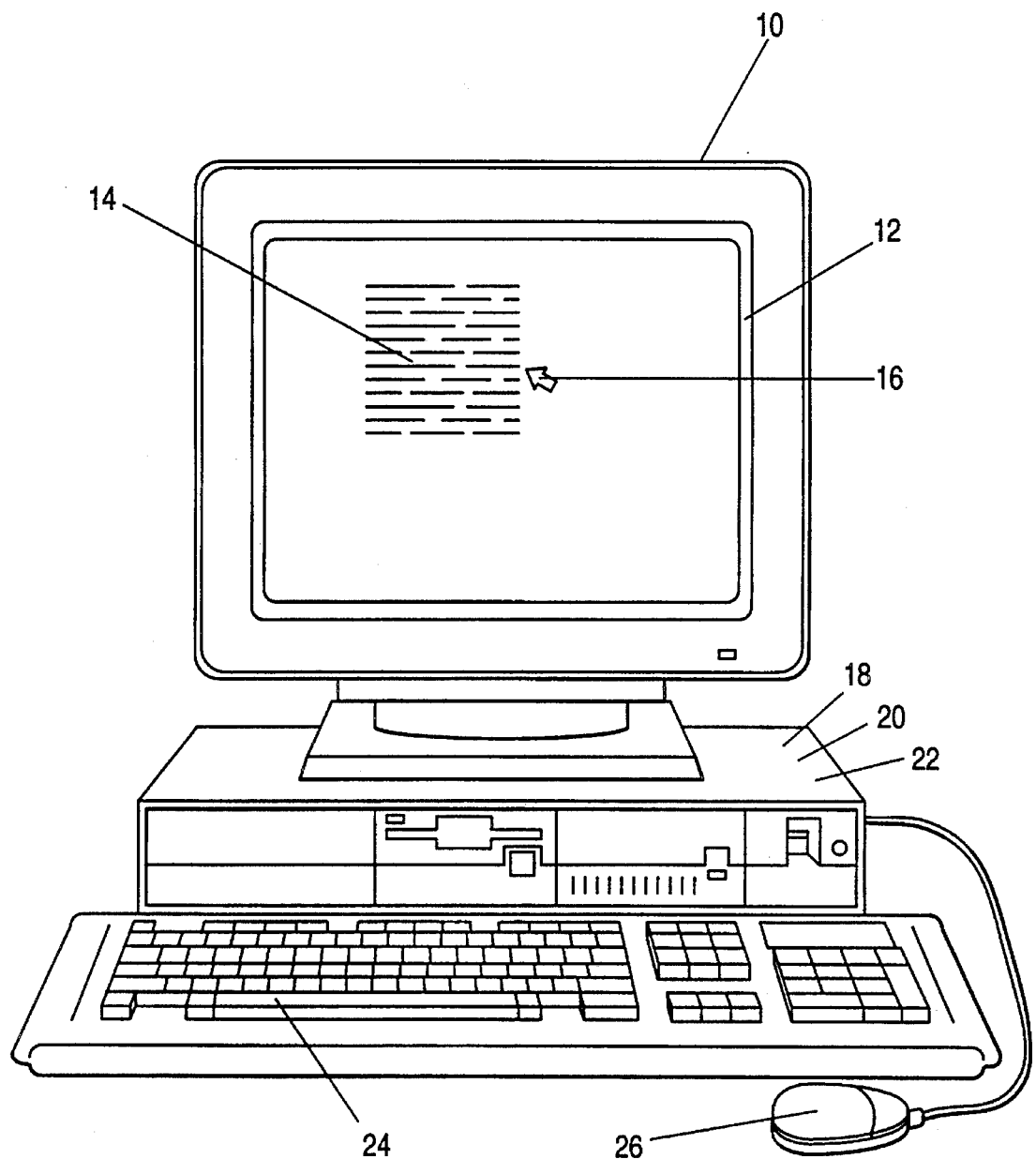
FIG. 1 is a schematic view of a computer on which the invention can desirably be implemented.

As seen in FIG. 1, the invention is typically carried out on a personal computer 10. The personal computer 10 includes the usual computer 18 having a memory 20 and a processor 22. The memory can be any suitable memory such as RAM, hard or floppy disk, CD-ROM, PROM, EPROM, or the like. Preferably the memory is RAM, with access to non-volatile memory for program and data storage. The processor 22 can be any suitable processor. The personal computer also is provided with a video-style screen 12, which can be any suitable design for showing alphanumeric characters, including but not limited to CRT screens, active matrix displays, passive matrix displays, and other flat screen displays.

Preferably, the personal computer 10 is equipped with a conventional mouse 26 which interacts with data shown on the screen 12 in a known way to let a user manipulate the mouse 26 to control the position of a pointer 16 on the screen so that data shown on the screen such as calculations 14 can be pointed to. Also, the mouse 26 has conventional actuation buttons (not shown), actuation of which permits a user to input to the computer 18 an indication that an item of data 14 pointed to on the screen 12 is to be acted upon.

A conventional keyboard 24 or other device for inputting alphanumeric characters to the computer 18 is provided to permit a user to enter data on which calculations can be performed.

Figure 6:
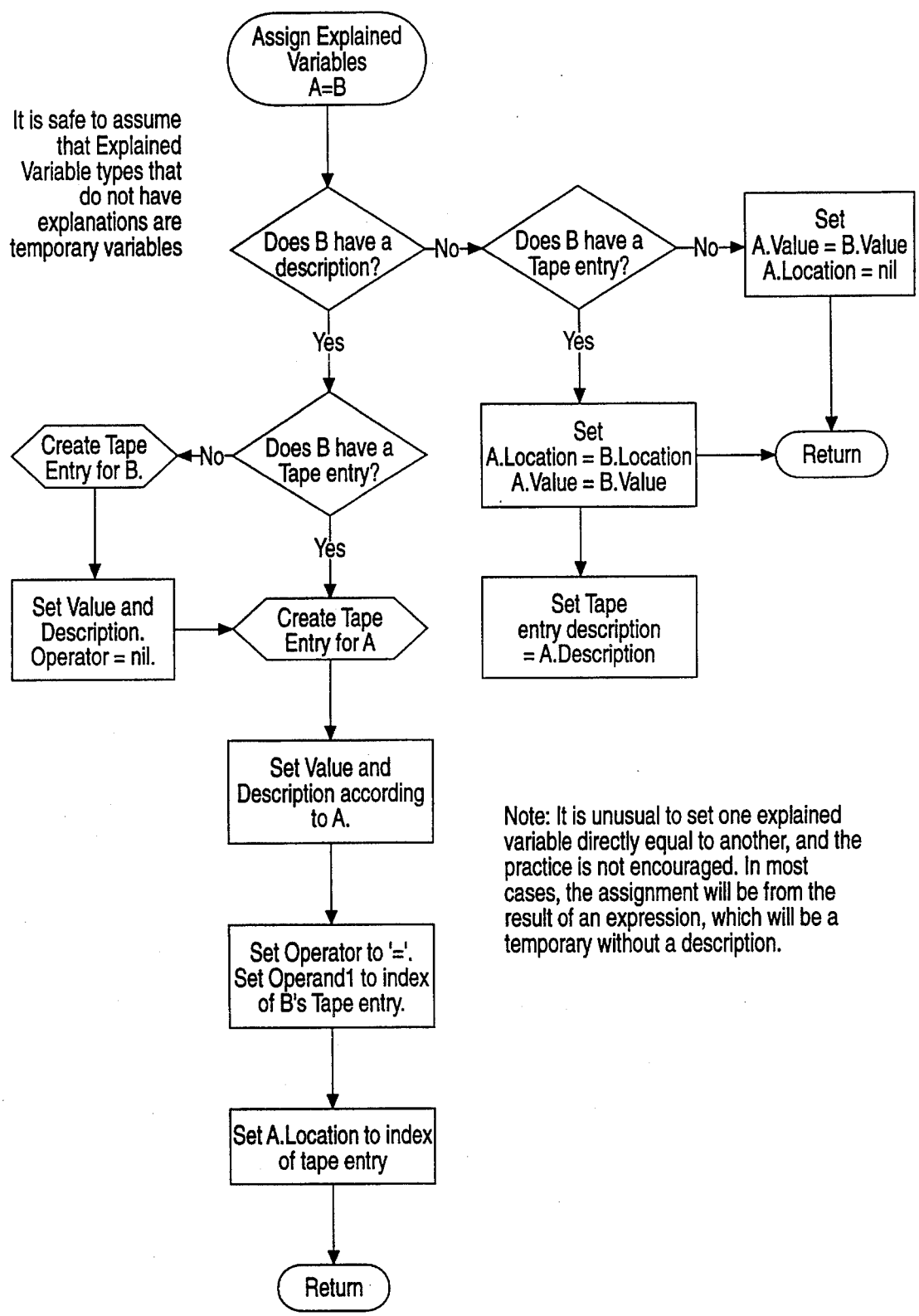
FIG. 6 is a flow chart of the processing of input data according to the preferred embodiment.
Figure 7:
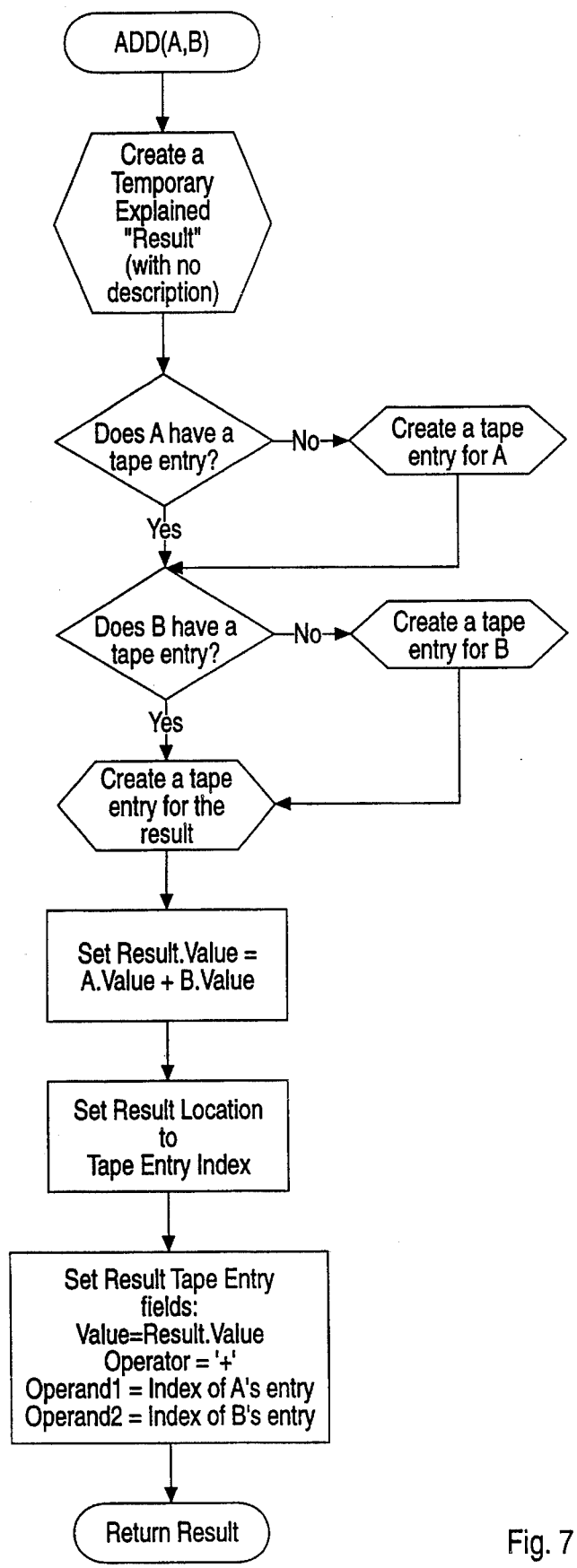
FIG. 7 is a flow chart of the processing of input data according to the preferred embodiment.

The invention provides routines stored in memory 20 to record the terms, descriptions of terms, steps, and intermediate results of some number of calculations while the calculations are performed. Preferably the data and calculation result are displayed on screen 12. FIG. 6 and 7 provide flow charts illustrating how to store data and calculations for later retrieval as needed to prepare the screen-displayed derivation of resulting values. This recording can, when desired, be used to display a description of the calculations as text, hypertext links, or a combination of the two, alongside and relating to a numeric record of the calculations. The numeric record is referred to herein as a "calculator tape", in analogy to a printing calculator. The degree of detail for the tape and the text/hypertext descriptions can be controlled and varied independently.

Calculations are recorded onto a global "tape": a database in which to store such information. The software caller is responsible for allocating a tape, and destroying it. For any given process, there can be only one current tape, though there may be many inactive tapes. The tape stores all of the information about the recorded calculation. The tape may grow as needed. When no longer needed, the tape is destroyed, releasing its memory back to the system.

A single process may use multiple sub-processes (threads) to perform recorded calculations in parallel, using the same tape. Only one process at a time may use the tape, however, so a monitor or critical section of the flow of the program is used to arbitrate access to the tape.

Figure 2:
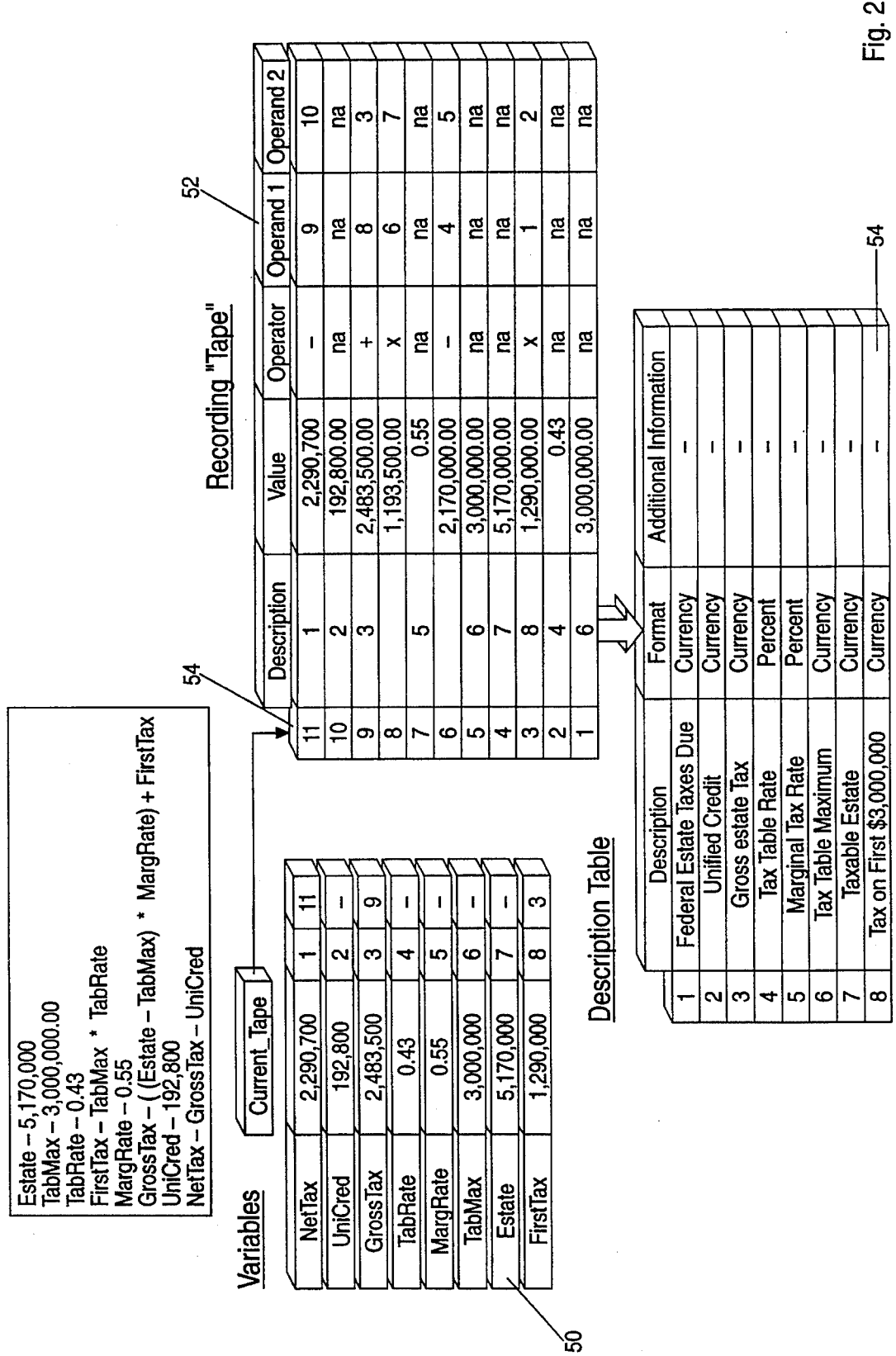
FIG. 2 is a table of data typically stored in use of the preferred embodiment of the invention.

A variable type is defined, referred to hereinafter as an "explained variable." An explained variable contains a value, a description or descripiton index (collectively referred to herein as a "description identifier"), and a link to its position in the tape, as seen in the box 50 of FIG. 2. An explained variable is allocated a position in the tape 52 only when it is assigned the result of a calculation. In a preferred embodiment, the "description" column of the recording tape contains an index into the Description table. There may be more than one Description table, which may be stored on disk (secondary storage) or in a database. The description need not be carried as part of the recorded calculation at all, but may be accessed separately by the process that displays or prints the confidence tape.

Each position 54 in the tape 52 contains a value, an index number representing a description, an operator, and two operands, which can be links. The value duplicates that of the corresponding variable, if one exists. The number representing the description is an integral value and is a pointer to a catalog of descriptions, stored in memory and represented by the lower box 54 of FIG. 2. There may be more than one catalog, or each reference may contain multiple entries. The operator records the operation used to combine the two operands to produce the value. Operators may be monadic, in which case the second operand is ignored. The operand links refer to other positions 54 in the tape, corresponding to previous variables or calculations.

The recording of calculations on the tape takes place during the evaluation of the expressions comprising the calculations. Recording occurs under program control, and the evaluation of the expression proceeds in the conventional manner. The recording process creates a binary tree describing the order of operations, the intermediate values, and any attached descriptions.

A screen-displayable confidence tape such as the examples shown in f FIGS. 3, 4 and 5 can be produced from any point on this tree by a controlled, recursive traversal.

Any node on the tree is either terminal or non-terminal. A terminal node is one whose value is not determined from an expression but which is simply given. Therefore, the operator for that entry 54 on the tape 52 is nil, and there are no operands. See, for example, the data in the number 4 position in the tape 52. It is useful, however, to be able to control the level of detail shown when displaying the confidence tape. This permits the level of detail to be varied as desired to result in, for example, the differing detail levels of the confidence tapes shown in FIGS. 3,4 and 5. To this end, a "Detail Level" parameter is defined, referred to as DLevel. Any entry that has a value that is produced by evaluation of no other explained variable is considered terminal and has DLevel=0.

All explained variables can therefore be classified as follows:

1. Operator is nil. The variable is terminal, and DLevel=0.
2. Operator is monadic, so there is only a left operand, e.g. log(x). DLevel=1 assuming x is terminal.
3. Both left and right operands are terminal, e.g. a+b. DLevel=1
4. Left operand is non-terminal, but right operand is terminal, e.g. (a+b)/c. DLevel is one higher than DLevel of the higher of a and b.
5. Left operand is terminal, but right operand is non-terminal, e.g. a/(b+c). DLevel is one higher than DLevel of the higher of b and c.
6. Both left and right operands are non-terminal, e.g. (a+b)/(c+d). DLevel is one higher than DLevel of the highest of a,b,c and d.

Since the confidence tape is displayed using the metaphor of a recording calculator, it has to carry out a linear sequence of steps. Whenever the right hand operand is non-terminal, it becomes necessary to remember the result of its evaluation. The confidence tape can do this either by extending the calculator metaphor to include a set of memories, or by effectively breaking the calculation into steps, or both. The use of memories makes the results easier to calculate on a real calculator, while division of steps makes the process easier to understand. In either case, the results are more easily interpreted if the right-hand evaluation is done first, so (a+b)/(c+d) becomes:

$$
\begin{array}{r}
c \\
+d \\
\hline
=x \\
\hline
a \\
+b \\
=y \\
/\ x \\
=z
\end{array}
$$

Using the classifications above, the confidence tape can be prepared using a procedure to determine how to produce the correct order, steps, and descriptions. The preferred embodiment uses the following procedures, correlated with the above classifications:

Class 1: Display single line of variable.

Class 2: Display left operand, operator, then result line.

Class 3: Display left Operand, Display Right Operand, Display Result.

Class 4: Same as Class 3.

Class 5: If operator is commutative, the expression can be reversed and treated like Class 3, e.g. a+(b−c)=(b−c)+a Otherwise, use the procedure of Class 6.

Class 6: Start a new step.

Display Right Operands and their operator and store the result in Memory Store.

End step, then Display Left Operands and their operator.

Display Right result only, with operator and Memory Recall

Figure 8A:
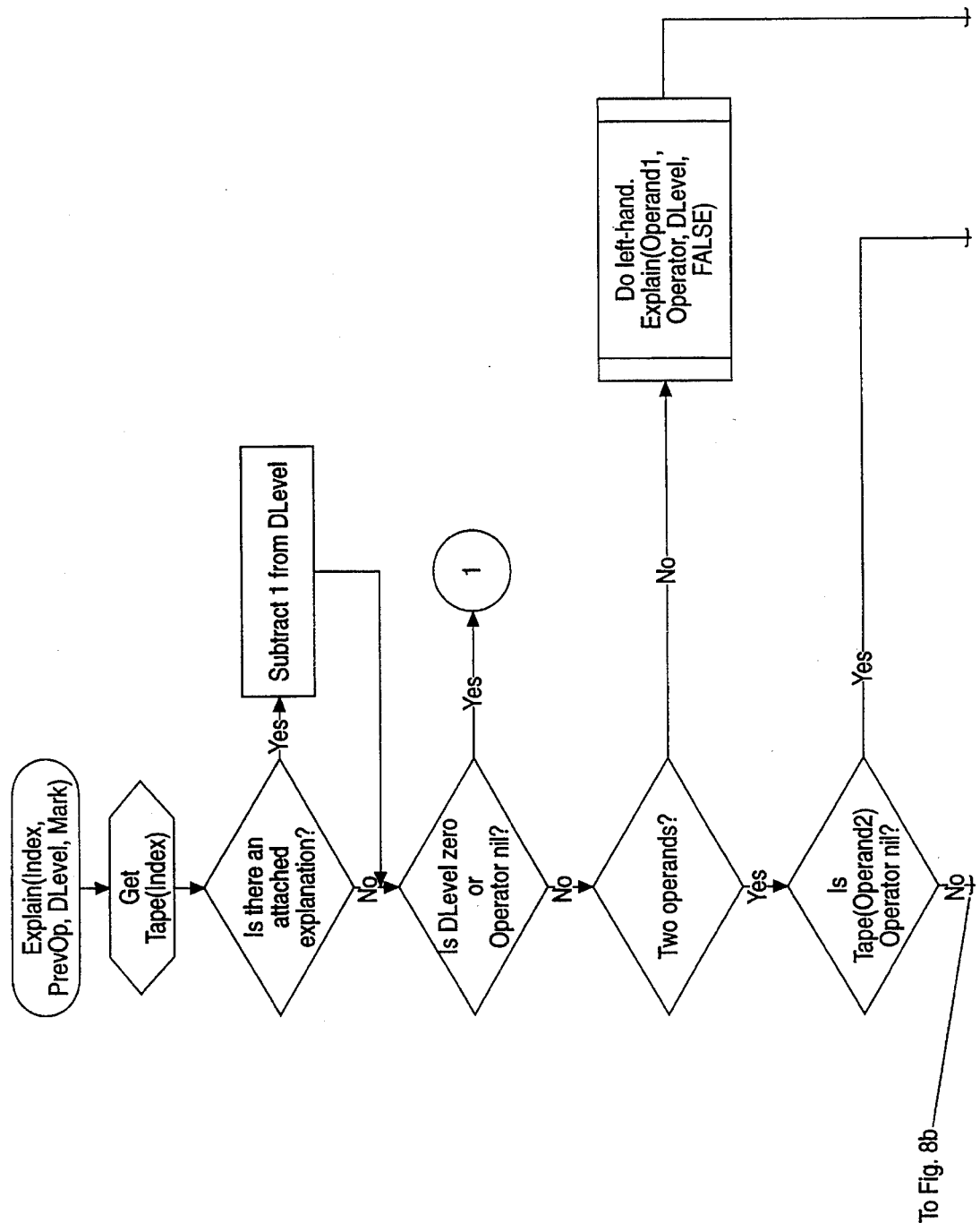
FIGS. 8, 9 and 10 are flow charts of the processing of data to display a confidence tape when desired according to the preferred embodiment.
Figure 8B:
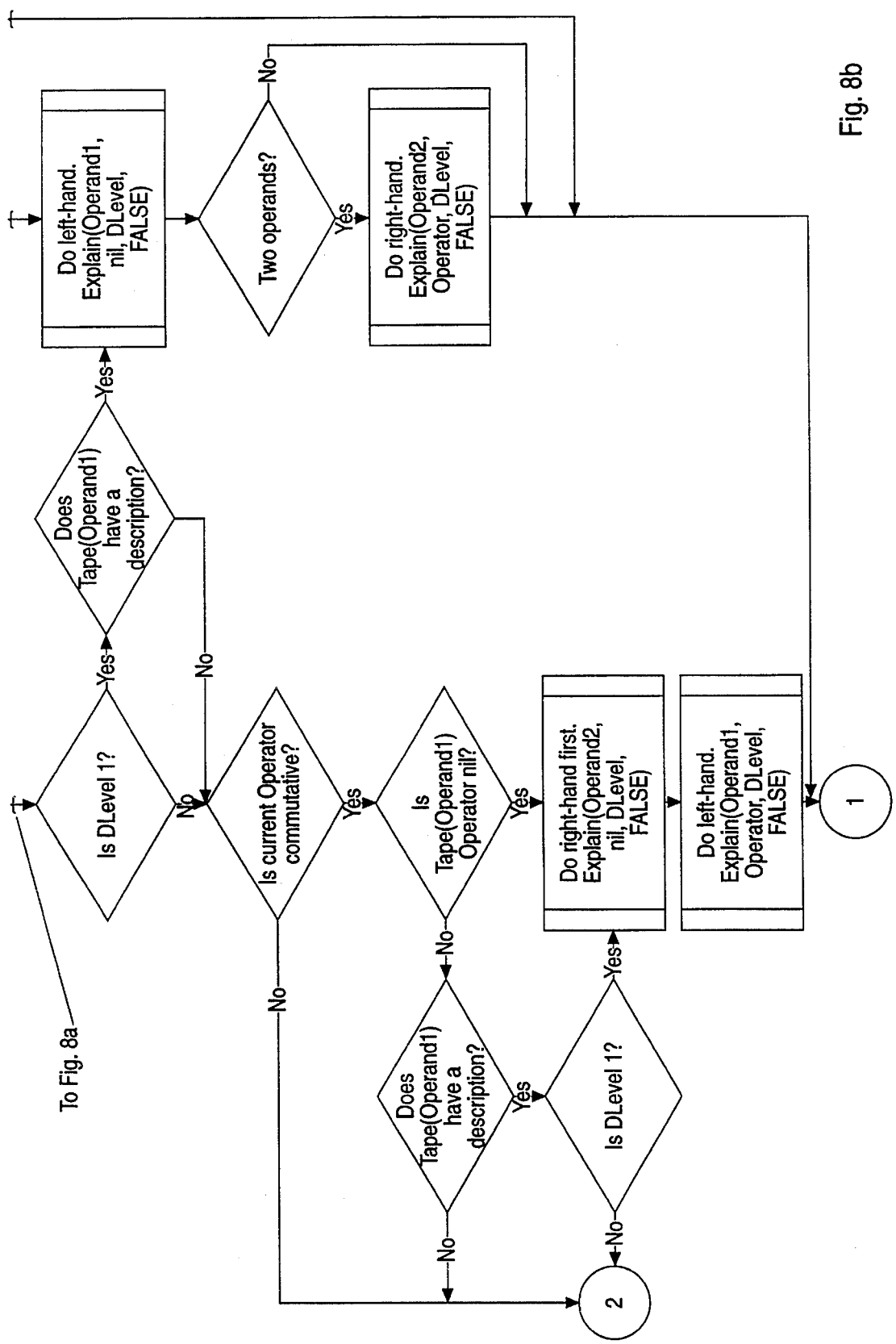
Figure 9:
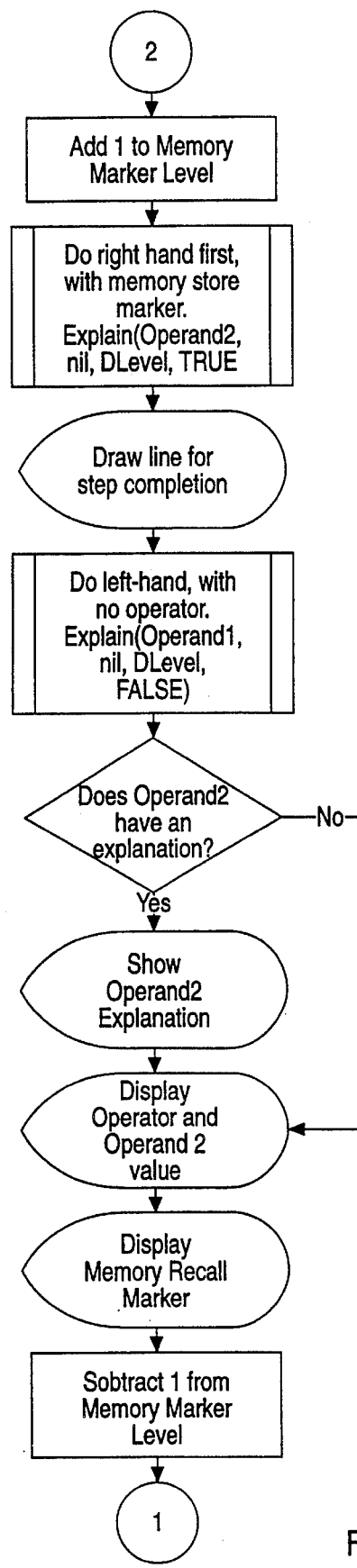
Figure 10:
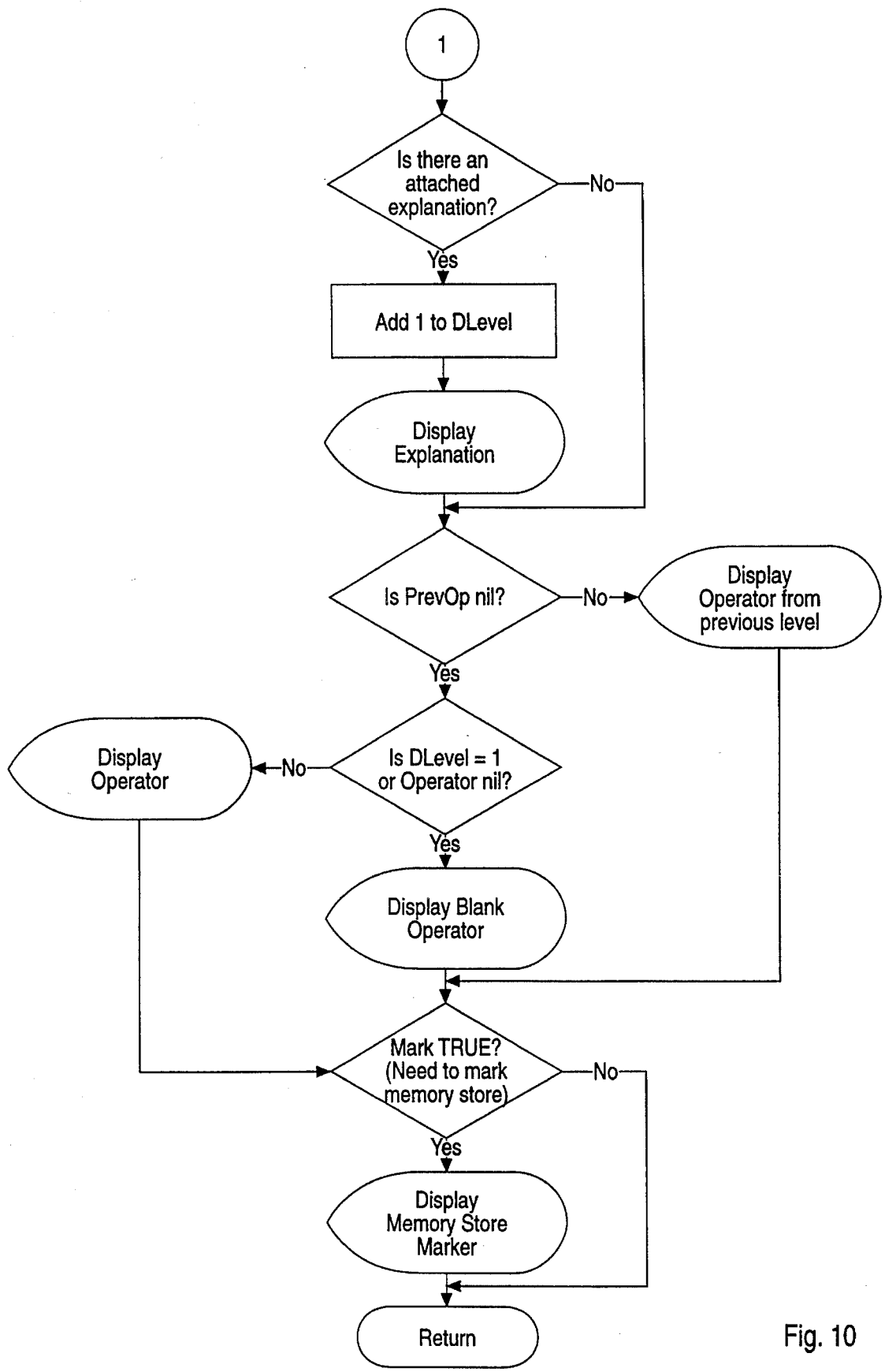

FIGS. 8, 9 and 10 are flow charts showing how the data stored during the operation of flow charts 6 and 7 can be used to compile data to be displayed using this technique. Actuation of the routine of FIGS. 8–10 is preferably initiated by pointing to a number 14 on screen 12 by manipulation of mouse 26 and actuating the mouse to indicate the desirability of showing the derivation of the pointed-to number. At that time the routine beginning in FIG. 8 is initiated. Alternatively, a "hotkey" on the keyboard 24 may be actuated to indicate the desirability of beginning the routine of FIGS. 8–10.

The program can control how many levels to display by either of two possibilites. First, there can be a global display level that the user can control, such as with a button. Or, the program can start with a minimal level and open up further levels in a specific part of the calculation, at the user's request (i.e. in the same or a similar fashion as he or she first calls for the derivation to be displayed), as is done with hypertext.

Preferably, at the completion of the input of data and calculation of results, a copy of the information can be prepared to permit portability of the data and the derivation-display capability. This is done by a simple copy command to copy the relevant data and program code. Preferably, this is in a "read only" form. In the context of insurance sales, this capability allows the prospect to take the salesperson's data assumptions, calculations, and conclusions to another adviser, such as an accountant or attorney, to let the advisor consider the appropriateness of the proposed insurance.

The use of the technique described herein is not, of course, limited to insurance sales computations, but can be used in any situation in which it is desired to have an accessible derivation of a final or tentative conclusion. For example, the preparation of confidence tapes of this sort in the preparation of software may be desirable, so that the source or location of errors or bugs in the software can be more easily detected.

What is claimed is:

1. An apparatus for illustrating a life insurance needs computational presentation comprising a computer including a memory and a processor, a video-style screen operatively connected to the computer for displaying data in numbers quantifying estate tax obligations of a proposed insured's estate to a viewer and obtaining the data to be displayed from said computer, a data input device operatively connected to said computer for inputting data concerning the proposed insured's estate to said computer, said computer memory including a first routine operable by said processor to respond to an input on said data input device to receive estate data from said data input device and to act on said data in a computational fashion and to show the result of said computation including estate tax numbers on said video-style screen and a second routine operable by said processor to respond to an input from said data input device to display on said screen a derivation of an estate tax computation shown on said screen.

2. An apparatus as claimed in claim 1 wherein said data input device includes a mouse-controlled pointer for said screen, said mouse being operable to identify items appearing on the screen and said second routine is triggered for a number on said screen by actuation of said mouse when said pointer identifies a number, the derivation of which is to be displayed on said screen.

3. An apparatus as claimed in claim 1 wherein said data input device includes a keyboard having alpha-numeric keys.

4. An apparatus as claimed in claim 1 wherein as a user inputs estate data into the apparatus through said data input device, steps of the computation proceed and said first routine stores data in said memory useful in said second routine's derivation display.

5. An apparatus as claimed in claim 4 wherein said first routine stores data for at least one step of a computation that includes a computational step number, a value, a description identifier, and operator, a first operand and a second operand.

6. An apparatus as claimed in claim 5 wherein the data stored for an operand is a computational step number of another step.

7. An apparatus as claimed in claim 6 wherein said second routine generates its derivational display by using the stored data, and links the steps of the displayed derivation by using computational step numbers stored as operands as pointers to include displays of other steps in a derivation.

8. An apparatus as claimed in claim 7 wherein said second routine continues recursively to accumulate derivation steps for display until the operands are not derived.

9. An apparatus as claimed in claim 1 furhter comprising a printer attached to said computer to print data and computation results.

10. An apparatus for illustrating a life insurance needs computational presentation comprising
   a. a computer including a memory and a processor,
   b. a video-style screen operatively connected to said computer for displaying data in numbers quantifying estate tax obligations of a proposed insured's estate to a viewer and obtaining data to be displayed from said computer,
   c. a data input device operatively connected to said computer for inputting data concerning the proposed insured's estate to said computer and including an alpha-numeric keyboard,
   d. said computer memory including
      1) a first routine operable by said processor to respond to an input on said data input device
         a) to receive estate data from said data input device,
         b) to act on said estate data in a computational fashion,
         c) to show the result of said computation on said video-style screen, and
         d) as steps of the computation proceed to store data in said memory that includes a computational step number, a value, a description identifier, an operator, a first operand and a second operand and in which the data stored for an operand is a computational step number of another step, and
      2) a second routine that responds to an input from said data input device to display on said screen a derivation of a computational result shown on said screen by
         a) using the stored data from which the computational result is directly calculated as a starting point,
         b) linking the steps of the derivation of the computational result by using computational step numbers stored as operands to point to other steps in a derivation to be displayed,
         c) continuing recursively to discern derivation steps for display until the operands are not derived, and
         d) displaying the steps of the derivation in order by displaying data stored about each step by the first routine.

11. A method of illustrating a life insurance needs computational presentation comprising
   a. providing a computer including a memory and a processor, a video-style screen operatively connected to the computer and a data input device operatively connected to the computer,
   b. inputting data concerning a proposed insured's estate to the computer,
   c. acting on the estate data in a computational fashion,
   d. storing data in the memory that includes a computational step number, a value, a description identifier, an operator, a first operand and a second operand and in which the data stored for an operand is a computational step number of another step,
   e. displaying data in numbers quantifying estate tax obligations of the proposed insured's estate to a viewer on the video-style screen,
   f. making an input to the computer indicating a command to show a computational derivation of a number displayed on the video-style screen and
   g. responding to the command by
      a) using the stored data from which the displayed number is directly calculated as a starting point,
      b) linking the steps of the derivation of the computational result by using computational step numbers stored as operands to point to other steps in a derivation to be displayed,
      c) continuing recursively to discern derivation steps for display until the operands are not derived, and
      d) displaying the steps of the derivation in order by displaying data stored about steps leading to the displayed number.

12. A method as claimed in claim 11 further comprising the step of preparing a copy of the data and program commands on a portable, machine-readable medium for the proposed insured.

13. An apparatus for illustrating a computational presentation comprising
   a computer including a memory and a processor,
   a video-style screen operatively connected to said computer for displaying data in numbers to a viewer and obtaining data to be displayed from said computer,
   a data input device operatively connected to said computer for inputting data to said computer,
   said computer memory including
      a first routine operable by said processor to respond to an input on said data input device to operate said computer to receive data from said data input device and to act on said data in a computational fashion and to show the result of said computation on said video-style screen and
      a second routine operable by said processor to respond to an input from said data input device to display on said screen a derivation of a computational result shown on said screen together with the computational result.

14. An apparatus as claimed in claim 13 wherein said apparatus is a personal computer.

15. An apparatus as claimed in claim 13 wherein said data input device includes a mouse-controlled pointer for said screen, said mouse being operable to identify items appearing on the screen and said second routine is triggered for a number on said screen by actuation of said mouse when said pointer identifies a number, the derivation of which is to be displayed on said screen.

16. An apparatus as claimed in claim 13 wherein said data input device includes a keyboard having alpha-numeric keys.

17. An apparatus as claimed in claim 13 wherein as steps of the computation proceed, said first routine stores data in said memory useful in said second routine's derivation display.

18. An apparatus as claimed in claim 17 wherein said first routine stores data for at least one step of a computation that includes a computational step number, a value, a description identifier, and operator, a first operand and a second operand.

19. An apparatus as claimed in claim 18 wherein the data stored for an operand is a computational step number of another step.

20. An apparatus as claimed in claim 19 wherein said second routine generates its derivational display by using the stored data, and links the steps of the displayed derivation by using computational step numbers stored as operands as pointers to include displays of other steps in a derivation.

21. An apparatus as claimed in claim 20 wherein said second routine continues recursively to accumulate derivation steps for display until the operands are not derived.

22. An apparatus for illustrating a computational presentation comprising
   a. a computer including a memory and a processor,
   b. a video-style screen operatively connected to said computer for displaying data in numbers to a viewer and obtaining data to be displayed from said computer,
   c. a data input device operatively connected to said computer for inputting data to said computer and including an alpha-numeric keyboard,
   d. said computer memory including
      1) a first routine that operates said computer to respond to an input on said data input device
         a) to receive data from said data input device,
         b) to act on said data in a computational fashion,
         c) to show the result of said computation on said video-style screen, and
         d) as steps of the computation proceed to store data in said memory that includes a computational step number, a value, a description identifier, an operator, a first operand and a second operand and in which the data stored for an operand is a computational step number of another step, and
      2) a second routine that responds to an input from said data input device to display on said screen a derivation of a computational result shown on said screen by
         a) using the stored data from which the computational result is directly calculated as starting point,
         b) linking the steps of the derivation of the computational result by using computational step numbers stored as operands to point to other steps in a derivation to be displayed,
         c) continuing recursively to discern derivation steps for display until the operands are not derived, and
         d) displaying the steps of the derivation in order by displaying the data stored about each step by the first routine.

23. A method of illustrating a computational presentation comprising
   a. providing a computer including a memory and a processor, a video-style screen operatively connected to the computer and a data input device operatively connected to the computer,
   b. inputting data to the computer,
   c. acting on the data in a computational fashion,
   d. storing data in the memory that includes a computational step number, a value, a description identifier, an operator, a first operand and a second operand and in which the data stored for an operand is a computational step number of another step,
   e. displaying data in numbers to a viewer of the video-style screen,
   f. making an input to the computer indicating a command to show a computational derivation of a number displayed on the video-style screen and
   g. responding to the command by
      a) using the stored data from which the displayed number is directly calculated as a starting point,
      b) linking the steps of the derivation of the computational result by using computational step numbers stored as operands to point to other steps in a derivation to be displayed,
      c) continuing recursively to discern derivation steps for display until the operands are not derived, and
      d) displaying the steps of the derivation in order by displaying data stored about steps leading to the displayed number.

* * * * *